United States Patent
Lai et al.

(10) Patent No.: US 11,365,486 B2
(45) Date of Patent: Jun. 21, 2022

(54) ELECTROLYTIC COPPER FOIL, ELECTRODE COMPRISING THE SAME, AND LITHIUM ION BATTERY COMPRISING THE SAME

(71) Applicant: CHANG CHUN PETROCHEMICAL CO., LTD., Taipei (TW)

(72) Inventors: Yao-Sheng Lai, Taipei (TW);
Jian-Ming Huang, Taipei (TW);
Kuei-Sen Cheng, Taipei (TW);
Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 148 days.

(21) Appl. No.: 16/203,700

(22) Filed: Nov. 29, 2018

(65) Prior Publication Data
US 2020/0119360 A1    Apr. 16, 2020

(30) Foreign Application Priority Data

Oct. 16, 2018 (CN) .................. 201811200604.5
Oct. 16, 2018 (TW) .................. 107136305

(51) Int. Cl.
*H01M 4/66* (2006.01)
*C25C 1/12* (2006.01)
*H01M 10/0525* (2010.01)

(52) U.S. Cl.
CPC .............. *C25C 1/12* (2013.01); *H01M 4/661* (2013.01); *H01M 10/0525* (2013.01)

(58) Field of Classification Search
CPC ............... C25D 1/04; C25D 3/38; C25C 1/12
See application file for complete search history.

(56) References Cited

U.S. PATENT DOCUMENTS

| | | | |
|---|---|---|---|
| 6,541,126 B1 * | 4/2003 | Yoshioka | C25D 1/04 428/201 |
| 2002/0005363 A1 | 1/2002 | Motohashi et al. | |
| 2013/0115510 A1 | 5/2013 | Tani et al. | |
| 2013/0216892 A1 * | 8/2013 | Matsuura | H01M 4/0404 429/144 |

(Continued)

FOREIGN PATENT DOCUMENTS

| CN | 102181889 | 9/2011 |
|---|---|---|
| CN | 202193865 | 4/2012 |

(Continued)

OTHER PUBLICATIONS

Lu, Lei, et al.; Ultrahigh Strenghtand High Electrical Conductivity in Copper; Science; vol. 304; (5669) pp. 422-426; Mar. 18, 2004 (Year: 2004).*
Lu, L, et al.; Nano-sized twin s induce high rate sensitivity of flow stress in pure copper; Acta Materialia 53 (2005); pp. 2169-2179 (Year: 2005).*
HunterLab; Test Methods for Color Measurement; Insighton Color; Apr. 2006, vol. 18, No. 4; pp. 1-10; https://ucanr.edu/datastoreFiles/608-155.pdf (Year: 2006).*

(Continued)

*Primary Examiner* — Edward J. Schmiedel
(74) *Attorney, Agent, or Firm* — WPAT, PC

(57) ABSTRACT

Provided are an electrolytic copper foil, an electrode comprising the same, and a lithium ion battery comprising the same. The electrolytic copper foil has a drum side and a deposited side opposing to the drum side, wherein a nanoindentation hardness of the drum side is equal to or larger than 0.5 GPa and equal to or smaller than 3.5 GPa; and a lightness of the drum side is equal to or larger than 25 and equal to or smaller than 75.

12 Claims, 1 Drawing Sheet

(56) References Cited

U.S. PATENT DOCUMENTS

| | | | | |
|---|---|---|---|---|
| 2014/0017564 A1* | 1/2014 | Suzuki | ............... | C22F 1/08 429/211 |
| 2015/0340639 A1* | 11/2015 | Matsuura | ............ | C25D 1/04 257/741 |
| 2017/0115074 A1 | 4/2017 | Cheng | | |

FOREIGN PATENT DOCUMENTS

| | | |
|---|---|---|
| CN | 105008593 | 10/2015 |
| CN | 204982121 | 1/2016 |
| CN | 106048666 | 10/2016 |
| CN | 205974704 | 2/2017 |
| CN | 106953099 | 7/2017 |
| CN | 107017213 | 8/2017 |
| CN | 107419303 | 12/2017 |
| JP | 2004-256910 | 9/2004 |
| JP | 2006-103189 | 4/2006 |
| JP | 2008-98157 | 4/2008 |
| JP | 2017076618 | 4/2017 |
| JP | 2018178261 | 11/2018 |
| KR | 10-2015-0086222 | 7/2015 |
| KR | 10-2018-0105476 | 9/2018 |
| TW | I247054 | 1/2006 |
| TW | 201311940 | 3/2013 |
| TW | 201312826 | 3/2013 |
| TW | 201728764 | 8/2017 |
| TW | 201735754 | 10/2017 |
| TW | 201829183 | 8/2018 |
| WO | 2014/112619 | 7/2014 |

OTHER PUBLICATIONS

Sarada, Bulusu V. et al.; Highly (111) texture Copper Foils with High Hardness and High Electrical Conductivity by Pulse Reverse Electrodeposition; Electrochemical and Solid-State Letters, 13 (6) D40-D42 (2010) (Year: 2010).*

Machine translation of CN 105008593 A; accessed and printer Aug. 11, 2021 (Year: 2015).*

Machine translation of JP 2017-076618 A; accessed and printed Aug. 11, 2021 (Year: 2017).*

Machine translation of JP 2018-178261 A; accessed and printed Aug. 11, 2021 (Year: 2018).*

Wang Ding-Shiang et al. The relationship between microstructural characteristics and mechanical properties of electrodeposited copper foils for PCB applications. 2010, National Dong Hwa University.

Japanese Industrial Standards Committee, JIS Z 8729-2004 Colour specification, published in 2004.

Japan Notice of Allowance dated Aug. 18, 2020.

China Examination Report dated Aug. 12, 2020.

"Machine Production Art Material Technique Pamphlet", Dec. 31, 1993, p. 474.

Bulusu V. Sarada, Ch. L. P. Pavithra, M. Ramakrishna, Tata N. Rao and G.Sundararajan, Highly(111) Textured Copper Foils with High Hardness and High Electrical Conductivity by Pulse Reverse Electrodeposition, Mar. 24, 2010, Electrochemical and Solid-State Letters.

* cited by examiner

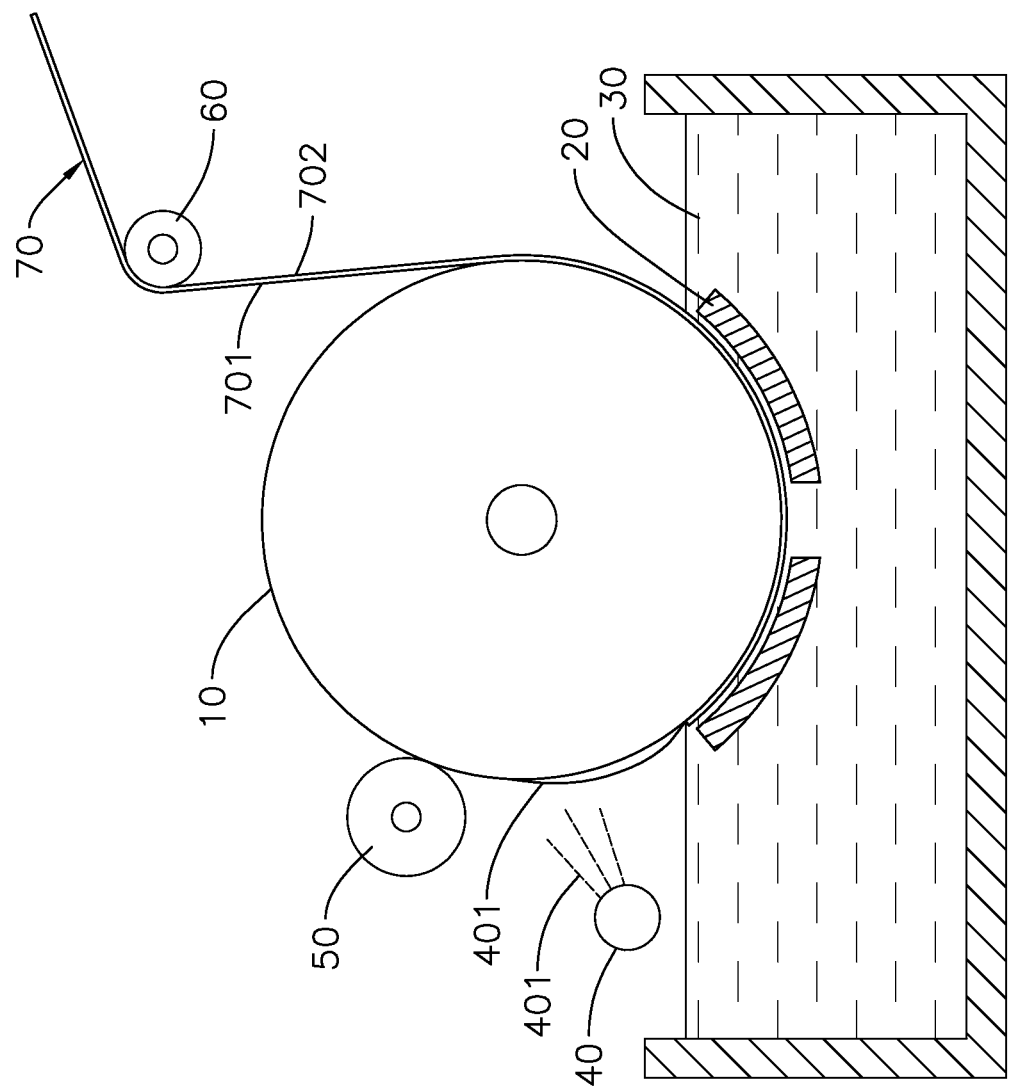

ELECTROLYTIC COPPER FOIL, ELECTRODE COMPRISING THE SAME, AND LITHIUM ION BATTERY COMPRISING THE SAME

CROSS-REFERENCE TO RELATED APPLICATION

Pursuant to 35 U.S.C. § 119(a), this application claims the benefit of the priority to China Patent Application No. 201811200604.5 filed on Oct. 16, 2018 and Taiwan Patent Application No. 107136305 filed on Oct. 16, 2018. The content of the prior application is incorporated herein by its entirety.

BACKGROUND

1. Field of the Disclosure

The present disclosure relates to an electrolytic copper foil, more particular to an electrolytic copper foil for an electrode of a lithium ion battery and a lithium ion battery comprising the same.

2. Description of the Prior Arts

With a rapid increase in demand for mobile electronic devices, electric vehicles (EVs), hybrid electric vehicles (HEVs), and so on, rechargeable lithium-ion batteries (LiBs) with a high electric energy density and a long cycle life have raised great attention. With good flexibility and excellent conductivity, the copper foil for use as an electrode of a lithium-ion battery has been one of the focuses of lithium-ion battery development.

The copper foil used for the lithium ion battery can be divided into a rolled copper foil and an electrolytic copper foil according to their preparation methods, wherein the rolled copper foil has to undergo repeated rolling and annealing steps, resulting in high production cost and limited width of the obtained copper foil. In comparison to the rolled copper foil, the electrolytic copper foil has low manufacturing cost and can be formed in a thin foil type. Therefore, the copper foil for a lithium ion battery is mainly made of the electrolytic copper foil.

For making an electrode, an electrolytic copper foil is generally coated with an active material on its surface and then is rolled. According to coating and pressing conditions of the active material layer, damages such as wrinkles and cracks, even breakings, may be formed on the copper foil. Once these damages occur, the yield rate of battery production is greatly reduced and the cycle performance of the lithium ion battery is lowered. To overcome the problems, some methods have been provided. For example, Taiwan Patent Publication No. 201728764 discloses an electrolytic copper foil with a good durability by limiting a ratio of tensile strengths at two different test speeds. Even though the foresaid electrolytic copper foil may extend cycle life of the lithium ion battery, the foresaid electrolytic copper foil still could not avoid breaking or cracking because the boundaries at where the active material is coated and not coated on the electrolytic copper foil have to endure different stresses during the pressing process. The yield rate of the battery production is still low and needs to be improved.

SUMMARY OF THE DISCLOSURE

In view that the conventional method has technical defects, an objective of the instant disclosure is to provide an electrolytic copper foil which has good mechanical properties, thereby reducing the breaking of the electrolytic copper foil to improve the production yield thereof.

To achieve the foresaid objective, the instant disclosure provides an electrolytic copper foil comprising a drum side and a deposited side opposing to the drum side. A nanoindentation hardness of the drum side is equal to or larger than 0.5 GPa and equal to or smaller than 3.5 GPa, and a lightness of the drum side is equal to or larger than 25 and equal to or smaller than 75.

By means of limiting the ranges of the nanoindentation hardness and the lightness of the drum side, the electrolytic copper foil can withstand the stress generated by the pressing. Therefore, the formation of wrinkles and breakings can be mitigated and even avoided, thereby improving the production yield, cycle performance, and service life of the lithium ion battery comprising the electrolytic copper foil.

An electrolytic copper foil usually is manufactured by supplying a copper sulfate electrolyte solution between an anode and a cathode drum, electrolyzing the copper sulfate electrolyte solution to deposit the electrolytic copper foil on the surface of the cathode drum, and then the electrolytic copper foil is continuously peeled off from the surface of the cathode drum and rolled up. The copper sulfate electrolyte solution mainly comprises sulfuric acid and copper sulfate. The anode is a dimensionally stable anode, which is usually made from a titanium plate coated with ruthenium or ruthenium oxide. The cathode drum is usually a titanium-made drum. One surface of the electrolytic copper foil which contacts the cathode drum is called the drum side, and the other surface of the electrolytic copper foil is called the deposited side.

Usually, the condition of the surface of the cathode drum at the initial time of electroplating significantly affects the hardness of the drum side of the electrolytic copper foil. After the electrolytic copper foil is peeled off from the surface of the cathode drum which is in close contact with the electrolytic copper foil, the surface of the cathode drum is exposed to the air. The exposure period depends on the rotating speed of the cathode drum. When producing a thicker copper foil, the rotating speed of the cathode drum is slower, so the period of exposure to the air is longer. Thus, the surface of the cathode drum would be very dry. When the dry surface of the cathode drum contacts the copper sulfate electrolyte solution again, the drum side of the electrolytic copper foil would have a lower hardness because the surface of the cathode drum has discrepancy on the wetting level. As a result of repeated studies by the inventors, it is found that before the cathode drum is about to dip into the copper sulfate electrolyte solution, the surface of the cathode drum can be moistened by spraying the same copper sulfate electrolyte solution onto the surface, thereby increasing the hardness of the drum side of the produced electrolytic copper foil.

In addition, the conventional electrolytic copper foil should have a multi-layered structure (e.g., two-layers or three-layers) to meet the requirements. The multi-layered structure is formed in sequence with different components or the component with different hardness. However, the electrolytic copper foil of the instant disclosure can obtain the desired mechanical properties without multiple forming processes; that is, the electrolytic copper foil is more suitable for a lithium ion battery and has higher commercial potential.

Preferably, the nanoindentation hardness of the drum side is equal to or larger than 1.0 GPa and equal to or smaller than 3.0 GPa.

Lightness (L*) is one of the three elements of the color system defined in JIS Z 8729. When the lightness is higher, the color is brighter and lighter, nearer to white. The lightness of the electrolytic copper foil is related to the condition of the surface of the cathode drum. When the degree of oxidation of the cathode drum is increased, the lightness of the drum side of the electrolytic copper foil is lower. In order to remove an oxide layer of the surface of the cathode drum, the surface of the cathode drum is polished by using an on-line polishing wheel when the cathode drum has been used to produce a certain length of electrolytic copper foil (usually 5,000 to 10,000 meters). Polishing wheels of each brand are categorized into different models based on the particle sizes of abrasive grains of the polishing wheels. In substance, the smaller the model number is, the bigger the particle sizes of abrasive grains of the polishing wheels are. The polishing wheels with the smaller model number can be used to quickly remove the oxide layer of the surface of the cathode drum, but the drum side of the subsequently obtained electrolytic copper foil deposited on the polished cathode drum has a higher surface roughness. On the contrary, the polishing wheel with the larger model number is suitable for fine polishing, and the drum side of the subsequently obtained electrolytic copper foil deposited on the polished cathode drum has a lower surface roughness and a higher lightness. Preferably, the lightness of the drum side of the electrolytic copper foil is equal to or larger than 35 and equal to or smaller than 65.

In accordance with the instant disclosure, at a crosshead speed of 50 mm/min, a tensile strength of the electrolytic copper foil is equal to or larger than 34 kgf/mm$^2$. For applying to a lithium ion secondary battery, the surface of the electrolytic copper foil would be coated with an active material, followed by a process such as pressing and slitting. If the tensile strength of the electrolytic copper foil is too low, the electrolytic copper foil may generate wrinkles, so the active material cannot be uniformly coated on the surface of the electrolytic copper foil. Preferably, the electrolytic copper foil has a tensile strength from 34.1 kgf/mm$^2$ to 34.8 kgf/mm$^2$.

In accordance with the instant disclosure, the surface roughness of the electrolytic copper foil is expressed by a ten-point mean roughness (Rz) defined in JIS B 0601-1994. The smoother the surface of the electrolytic copper foil (i.e. the smaller the Rz) is, the finer crystal the surface of the electrolytic copper foil has. Therefore, the surface area of the electrolytic copper foil would be increased, and the current would also be increased. However, if the surface area of the electrolytic copper foil is too smooth, the adhesive strength between the active material and the surface of the electrolytic copper foil would be decreased, which may cause delamination between the active material layer and the electrolytic copper foil and deteriorate the performance of the lithium ion battery. For the drum side, a Rz of the drum side is equal to or larger than 1.0 μm and equal to or smaller than 2.5 μm, preferably equal to or larger than 1.2 μm and equal to or smaller than 2.0 μm. For the deposited side, a Rz of the deposited side is equal to or larger than 1.0 μm and equal to or smaller than 3.0 μm, preferably equal to or larger than 1.4 μm and equal to or smaller than 2.0 μm.

In some cases, a nanoindentation hardness of the deposited side of the electrolytic copper foil is equal to or larger than 1.5 GPa and equal to or smaller than 2.0 GPa.

In accordance with the instant disclosure, there is no particular limitation on the thickness of the electrolytic copper foil. Preferably, the electrolytic copper foil has a thickness of 3 μm to 105 μm. More preferably, the electrolytic copper foil has a thickness of 5 μm to 30 μm.

In order to improve the function of the electrolytic copper foil such as anti-corrosion, a surface treatment may be optionally and additionally performed on the electrolytic copper foil as needed; for example, the surface treatment on the electrolytic copper foil may include any one of an anti-corrosion treatment and a silane coupling treatment or a combination thereof, but is not limited thereto. Accordingly, at least one of the drum side and the deposited side of the electrolytic copper foil could have an anti-corrosion layer or a silane coupling layer.

In terms of anti-corrosion treatment, an organic anti-corrosion treatment could use an azole compound, or an inorganic anti-corrosion treatment could use a chromate; therefore, an inorganic anti-corrosion layer or an organic anti-corrosion layer is formed on at least one of the drum side and the deposited side of the electrolytic copper foil. Anti-corrosion components would be attached to the surface of the electrolytic copper foil by the method of dip coating, spraying, plating or the like, but it is not limited thereto.

Examples of the azole compound include a triazole-based compound such as triazole, benzotriazole, tolyltriazole, carboxybenzotriazole, chloro-substituted benzotriazole, 3-amino-1, 2, 4-triazole, 4-amino-1, 2, 4-triazole, or the derivatives thereof; a thiazole-based compound such as thiazole, isothiazole, 2-amino-4-methylthiazole, or the derivatives thereof; or an imidazole-based compound such as imidazole, 2-aminobenzimidazole, 2-mercapto-1-methyl-imidazole, 1-(2-hydroxyethyl)-2-methylimidazole, 1-(2-chloroethyl)-2-methylimidazole, or the derivatives thereof. The organic anti-corrosion treatment can use at least one of the foresaid azole compounds.

The silane coupling treatment adopts a silane coupling agent to treat the surface of the electrolytic copper foil. The silane coupling agent may include, but is not limited to, a compound represented by the chemical formula: $Y-(R')_n-Si(OR)_3$; wherein Y is selected from the group consisting of: a glycidyl group (i.e. epoxy group), an amino group, an epoxycyclohexyl group, an uramino group, a carbamate group, a malonic ester group, a carboxyl group, a mercapto group, a cyano group, an acetoxy group, an acryloxy group, a methylacryloxy group, a chloromethylphenyl group, a pyridyl group, a vinyl group, a dialkylamino group, a phenylalkylamino group, and an imidazolyl group; wherein n is an integer 0 or 1; wherein R' is selected from the group consisting of: a methylene group, an ethylene group, a propylene group, and a phenylene group substituted with an ethyl or a propyl group, wherein the phenylene group is bonded to Y; and wherein R is selected from the group consisting of: a methyl group, an ethyl group, and a linear or branched C3 to C6 alkyl group. Specifically, the silane coupling agent can be an epoxy-based silane, an amino-based silane, a methacryloxy-based silane, a vinyl-based silane, or a mercapto-based silane. The silane coupling treatment can be carried out by using one or more silane coupling agents.

The instant disclosure further provides an electrode which comprises the foresaid electrolytic copper foils. Preferably, the electrode is a negative electrode.

Specifically, the electrode further comprises at least one binder and at least one active material.

For example, the binder may be, but is not limited to, poly-1,1-difluoroethene (abbreviation: PVDF), poly(acrylic acid), carboxymethyl cellulose (abbreviation: CMC), styrene butadiene rubber (abbreviation: SBR), polyimide (abbreviation: PI), poly vinyl alcohol, or any combination thereof.

The electrolytic copper foil is particularly suitable to be a current collector of a negative electrode, and the negative electrode current collector is suitable for a lithium ion secondary battery. Generally, one or both sides of the electrolytic copper foil are coated with a negative electrode active material (simply referred to as "active material"). The active material may be formed to one or more layers on or around the negative electrode current collector, and the active material usually contains a carbon material.

The active material makes the electrode have a good cycle performance. For example, the active material may comprise a carbon material, a silicon material, a metal, a metal oxide, a metal alloy, a polymer, or any combination thereof. Preferably, the active material is the carbon material or the silicon material.

Specifically, the carbon material may be, but is not limited to, a non-graphitizing carbon, a coke, a graphite, a glasslike carbon, a carbon fiber, an activated carbon, a carbon black, or a high polymer calcined material. Among them, the coke comprises a pitch coke, a needle-shaped coke, or a petroleum coke; the high polymer calcined material is obtained by burning a high polymer such as a phenol-formaldehyde resin or a furan resin at a suitable temperature, and the burned high polymer is carbonated.

When the silicon material is used to be the negative anode active material, the silicon material would have an excellent ability to form an alloy with lithium ions and have an excellent ability to extract lithium ions from a lithium alloy. Moreover, a lithium ion battery comprising the silicon material can have a great energy density. The silicon material may form an alloy material with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), stibium (Sb), chromium (Cr), ruthenium (Ru), molybdenum (Mo), or any combination thereof.

Specifically, the metal or the elements of the metal alloy may be selected from the group consisting of: cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), stibium (Sb), chromium (Cr), ruthenium (Ru), and molybdenum (Mo), but it is not limited thereto. Examples of the metal oxide may be, but is not limited to, iron (III) oxide ($Fe_2O_3$), iron (II, III) oxide ($Fe_3O_4$), ruthenium (IV) oxide ($RuO_2$), molybdenum (IV) oxide ($MoO_2$), or molybdenum (VI) oxide ($MoO_3$).

Specifically, the polymer may be, but is not limited to, polyacetylene or polypyrrole.

In addition, the electrode may comprise an auxiliary additive as needed without affecting the function of the electrode of the instant disclosure. The auxiliary additive may be, but is not limited to, lithium hydroxide (LiOH) or oxalic acid ($H_2C_2O_4$).

The instant disclosure further provides a lithium ion battery which comprises the foresaid electrode for a lithium ion battery as a negative electrode, a positive electrode, and an electrolyte solution. In some cases, a separator may be inserted between the positive electrode and the negative electrode of the lithium ion battery.

Specifically, the electrolyte solution may comprise a solvent and an electrolyte dissolved in the solvent. Optionally, the electrolyte solution may further comprise an additive as needed. The solvent includes a non-aqueous solvent such as a cyclic carbonate, a chain carbonate, and a sultone, but is not limited thereto. For example, the cyclic carbonate may be ethylene carbonate (EC) or propylene carbonate (PC); the chain carbonate may be dimethyl carbonate (DMC), diethyl carbonate (DEC), or ethyl methyl carbonate (EMC). The solvent may comprise a single component or a combination of two or more components to form solvent mixtures. For example, the solvent mixtures may comprise a high dielectric constant solvent such as ethylene carbonate or propylene carbonate and a low viscosity solvent such as dimethyl carbonate, diethyl carbonate or ethyl methyl carbonate, so the solvent mixtures have a high solubility to the electrolyte and a high ion conductivity.

The electrolyte solution may be used in its original form or in a gel form which is made of a mix of the electrolyte solution and a polymer material. The separator may be immersed in the electrolyte solution, or the electrolyte solution may be disposed in layers which are between the separator and the negative electrode and between the separator and the positive electrode. In some cases, the preferred polymer material may be a polymer including vinylidene difluoride with a high stability of redox. In other cases, the polymer material may be formed by mono-functional acrylates such as acrylates, mono-functional methacrylates such as methacrylates, multi-functional acrylates such as diacrylates or triacryaltes, multi-functional methacrylates such as dimethacrylates or trimethacryaltes, acrylonitrile, methacrylonitrile, or other monomers. Preferably, the polymer material may be polymerized by the acrylates or the methacrylates because the acrylates or the methacrylates are easy to polymerize and have high polymeric reactivity.

In accordance with the instant disclosure, there is no particular limitation on the structures or types of the lithium ion battery. The lithium ion battery may be a stacked cell which is stacked by a sequence of a negative electrode, a separator, and a positive electrode. The lithium ion battery may also be a spiral-wound cell which comprises a continuous positive electrode, a continuous negative electrode and a separator spirally wound together. In addition, there is no particular limitation on the shapes of the lithium ion battery. The lithium ion battery may be a cylindrical secondary battery for a laptop personal computer, a cubical secondary battery for a mobile phone, or a button-shaped (i.e. coin-shaped) secondary battery. A package of the lithium ion battery may be, but is not limited to, a typical aluminum can, a stainless steel can, or a laminated film.

Other objectives, advantages and novel features of the disclosure will become more apparent from the following detailed description when taken in conjunction with the accompanying drawings.

BRIEF DESCRIPTION OF THE DRAWING

FIG. 1 is a schematic view of the process to make an electrolytic copper foil of the instant disclosure.

DETAILED DESCRIPTION OF THE DISCLOSURE

Hereinafter, one skilled in the art can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

The instrument model used in the following examples:
1. nanoindentation system: Nano Indenter XPW SYSTEM XPW291 manufactured by MTS;
2. spectrophotometer: CM-2500c manufactured by Konica Minolta;
3. α-type surface roughness measuring instrument: SE 1700 manufactured by Kosaka Laboratory;
4. tensile testing machine: AG-I manufactured by SHIMADZU Corporation;
5. pressing machine: BCR-250 manufactured by Shyh Horng Machinery Industrial; and
6. battery cell charge and discharge test system: Series 4000 manufactured by Maccor.

Materials used in the following examples:
1. low molecular weight gelatin DV: purchased from Nippi Inc.;
2. sodium 3-mercaptopropanesulphonate: purchased from Hopax Chemicals Manufacturing Company Ltd.;
3. hydrochloric acid: purchased from RCI Labscan Ltd.;
4. thiourea: purchased from Panreac Quimica SAU; and
5. carbon black: Super P® purchased from UBIQ technology.

Manufactures of Electrolytic Copper Foils

Preparation of a copper sulfate electrolyte solution for an electrolytic bath:

A copper wire is dissolved in a 50 wt % sulfuric acid aqueous solution to prepare an essential solution including copper sulfate ($CuSO_4 \cdot 5H_2O$) and sulfuric acid. In the essential solution, a concentration of the copper sulfate is 320 g/liter (g/L) and a concentration of the sulfuric acid is 100 g/L. Then, 5.5 mg of low molecular weight gelatin DV, 3 mg of sodium 3-mercaptopropanesulphonate, 0.01 mg of thiourea, and 25 mg of hydrochloric acid are added in each liter of the essential solution to form the copper sulfate electrolyte solution for the electrolytic bath.

Electrolytic Copper Foil of Example 1

With reference to FIG. 1, before the rotating cathode drum 10 was dipped into the electrolytic bath comprising a copper sulfate electrolyte solution 30, a spraying apparatus 40 sprayed a spraying solution 401 of the temperature of 55° C. on a not-yet-dipped region of the surface of the cathode drum 10 with a parabolic distribution at a flow rate of 5 L/min. The spraying apparatus 40 was installed at a distance of about 5 cm from the cathode drum 10 and had an elevation angle of 45 degrees. The spraying solution 401 had the same ingredients of the same concentrations with those of the copper sulfate electrolyte solution 30.

The cathode drum 10 was rotated counterclockwise at a linear velocity of 1 meter/min, and the cathode drum 10 was mechanically polished by a polishing wheel 50 (model number: 2000, manufactured by Kure Grinding Wheel) at a rotational speed of 300 rpm to remove the impurities on the surface of the cathode drum 10. The pressure applied to the cathode drum 10 by the polishing wheel 50 was controlled by a load current of a polishing rotary driving motor (not shown in FIG. 1), and the load current was set to 1.2 A.

In the electrolytic bath set at 50° C., a current with a current density of 50 $A/dm^2$ flowed between the cathode drum 10 and the anode plate 20 which was disposed along the curved surface of the cathode drum 10. Therefore, copper ions contained in the copper sulfate electrolyte solution 30 were electrodeposited on the curved surface of the cathode drum 10 to fabricate the electrolytic copper foil 70. Subsequently, the electrolytic copper foil 70 was peeled off from the cathode drum 10 and continuously rolled by a series of guiding rolls 60. The electrolytic copper foil 70 had a drum side 701 and a deposited side 702 opposite to the drum side 701. The electrolytic copper foil 70 had a thickness of 8 μm.

In some cases, the electrolytic copper foil 70 might be subsequently treated, such as by surface roughening, with anti-corrosion treatment, and by metal or metal alloy plating. The anti-corrosion treatment might be performed by electric plating with a chromate solution of a temperature of 31.5° C. The chromate solution comprised chromic acid with a concentration of 1.5 g/L. A current used in the electric plating had a current density of 0.5 $A/dm^2$. After completion of the treatment, the drum side 701 and the deposited side 702 each respectively had an inorganic anti-corrosion layer comprising chromates.

Electrolytic Copper Foil of Example 2

The process used to manufacture the electrolytic copper foil of Example 2 was similar to the process used to manufacture the electrolytic copper foil of Example 1. The differences between the processes were that the polishing wheel with model number 2000 used in Example 1 was replaced by the polishing wheel with model number 1500; and the temperature of the spraying solution changed from 55° C. to 45° C.

Electrolytic Copper Foil of Example 3

The process used to manufacture the electrolytic copper foil of Example 3 was similar to the process used to manufacture the electrolytic copper foil of Example 1. The difference between the processes was that the flow rate of the spraying solution changed from 5 L/min to 10 L/min.

Electrolytic Copper Foil of Example 4

The process used to manufacture the electrolytic copper foil of Example 4 was similar to the process used to manufacture the electrolytic copper foil of Example 2. The difference between the processes was that the flow rate of the spraying solution changed from 5 L/min to 10 L/min.

Electrolytic Copper Foil of Example 5

The process used to manufacture the electrolytic copper foil of Example 5 was similar to the process used to manufacture the electrolytic copper foil of Example 4. The differences between the processes were that the flow rate of the spraying solution changed from 10 L/min to 20 L/min; and the temperature of the spraying solution changed from 45° C. to 55° C.

Electrolytic Copper Foil of Example 6

The process used to manufacture the electrolytic copper foil of Example 6 was similar to the process used to manufacture the electrolytic copper foil of Example 1. The differences between the processes were that the flow rate of the spraying solution changed from 5 L/min to 20 L/min; and the temperature of the spraying solution changed from 55° C. to 45° C.

Electrolytic Copper Foil of Comparative Example 1

Compared to the process used to manufacture the electrolytic copper foil of Example 1, the process used to manufacture the electrolytic copper foil of Comparative Example 1 had the same step to polish the cathode drum and the same step to electrodeposit the electrolytic copper foil, but it did not have the step of spraying the spraying solution onto the surface of the cathode drum. The process used to manufacture the electrolytic copper foil of Comparative Example 1 was as follows.

Before the cathode drum was dipped into the electrolytic bath comprising a copper sulfate electrolyte solution, the cathode drum was rotated counterclockwise at a linear velocity of 1 meter/min, and the cathode drum was mechanically polished by a polishing wheel (model number: 1500, manufactured by Kure Grinding Wheel) at a rotational speed of 300 rpm. The pressure applied to the cathode drum by the polishing wheel was controlled by a load current of a polishing rotary driving motor, and the load current was set to 1.2 A.

In the electrolytic bath whose temperature is 50° C., a current with a current density of 50 A/dm² flowed between the cathode drum and the anode plate which was disposed along the curved surface of the cathode drum. Therefore, copper ions contained in the copper sulfate electrolyte solution were electrodeposited on the curved surface of the cathode drum to fabricate the electrolytic copper foil. Subsequently, the electrolytic copper foil was peeled off from the cathode drum and continuously rolled by a series of guiding rolls. The electrolytic copper foil had a thickness of 8 μm.

Electrolytic Copper Foil of Comparative Example 2

The process used to manufacture the electrolytic copper foil of Comparative Example 2 was similar to the process used to manufacture the electrolytic copper foil of Example 3. The difference between the processes was that the temperature of the spraying solution changed from 55° C. to 70° C.

Electrolytic Copper Foil of Comparative Example 3

The process used to manufacture the electrolytic copper foil of Comparative Example 3 was similar to the process used to manufacture the electrolytic copper foil of Example 4. The difference between the processes was that the temperature of the spraying solution changed from 45° C. to 30° C.

Electrolytic Copper Foil of Comparative Example 4

The process used to manufacture the electrolytic copper foil of Comparative Example 4 was similar to the process used to manufacture the electrolytic copper foil of Example 3. The difference between the processes was that the flow rate of the spraying solution changed from 10 L/min to 1 L/min.

Electrolytic Copper Foil of Comparative Example 5

The process used to manufacture the electrolytic copper foil of Comparative Example 5 was similar to the process used to manufacture the electrolytic copper foil of Example 5. The difference between the processes was that the flow rate of the spraying solution changed from 20 L/min to 50 L/min.

Electrolytic Copper Foil of Comparative Example 6

The process used to manufacture the electrolytic copper foil of Comparative Example 6 was similar to the process used to manufacture the electrolytic copper foil of Example 6. The difference between the processes was that the flow rate of the spraying solution changed from 20 L/min to 65 L/min.

Electrolytic Copper Foil of Comparative Example 7

The process used to manufacture the electrolytic copper foil of Comparative Example 7 was similar to the process used to manufacture the electrolytic copper foil of Example 6. The difference between the processes was that the polishing wheel with model number 2000 used in Example 6 was replaced by the polishing wheel with model number 1000.

Electrolytic Copper Foil of Comparative Example 8

The process used to manufacture the electrolytic copper foil of Comparative Example 8 was similar to the process used to manufacture the electrolytic copper foil of Example 6. The difference between the processes was that the polishing wheel with model number 2000 used in Example 6 was replaced by the polishing wheel with model number 2500.

Analysis 1: Nanoindentation Hardness of Surfaces of the Electrolytic Copper Foils The electrolytic copper foils of Examples 1 to 6 and Comparative Examples 1 to 8 were analyzed for surface hardness of the drum sides and the deposited sides of the electrolytic copper foils by the nanoindentation system.

The nanoindentation system adopted a Berkovich indenter with a curvature radius of equal to or smaller than 50 nm. The indenter pressed the analyzed surfaces of the electrolytic copper foil at a speed of 0.04 mm/sec. Owing to the interference caused by the flatness of the surface, the measured value obtained from initial pressing would be higher than the true value. As the depth of the indentation became deeper, the measured value would gradually become more stable, which was regarded as the true value of the surface hardness. Therefore, the surface hardness of the instant disclosure was represented by the value measured at an indentation depth of 300 nm. The nanoindentation hardness of the drum sides and the deposited sides of the electrolytic copper foils of Examples 1 to 6 and Comparative Examples 1 to 8 was shown in Table 1.

Analysis 2: Lightness of Surfaces of the Electrolytic Copper Foils

According to the standard MS Z 8722(2000), the electrolytic copper foils of Examples 1 to 6 and Comparative Examples 1 to 8 were analyzed for the lightness of the drum sides of the electrolytic copper foils by using the spectrophotometer CM-2500c, which was manufactured by Konica Minolta, and by adopting the mode of "Methods of Colour measurement method-Reflecting and transmitting objects". The lightness of the drum sides of the electrolytic copper foils of Examples 1 to 6 and Comparative Examples 1 to 8 was shown in Table 1.

Analysis 3: Surface Roughness of the Electrolytic Copper Foils

According to the standard JIS B 0601-1994, the electrolytic copper foils of Examples 1 to 6 and Comparative Examples 1 to 8 were analyzed for the surface roughness of the drum sides and the deposited sides of the electrolytic copper foils by using the α-type surface roughness measuring instrument. The surface roughness of the instant disclosure was represented by ten-point mean roughness (Rz). Rz of the drum sides and the deposited sides of the electrolytic copper foils of Examples 1 to 6 and Comparative Examples 1 to 8 was shown in Table 1.

Analysis 4: Tensile Strength of the Electrolytic Copper Foils

A maximum load of the tensile strength was measured by extracting testing specimens having a length of 100 mm and a width of 12.7 mm from the electrolytic copper foils obtained in Examples 1 to 6 and Comparative Examples 1 to 8, and a tension strength test was performed at a chuck distance of 50 mm and a crosshead speed of 50 mm/min under the standard IPC-TM-650 2.4.18, referred to as room-temperature tensile strength. The room temperature was 25° C. Tensile strengths of the electrolytic copper foils of Examples 1 to 6 and Comparative Examples 1 to 8 were shown in Table 1.

As listed in Table 1, Examples are expressed as E; Comparative Examples are expressed as C; and the nanoindentation hardness of the surface is abbreviated to surface hardness.

TABLE 1 surface hardness, lightness, Rz, and tensile strength
of Examples 1 to 6 and Comparative Examples 1 to 8

| Example No. | Drum Side of Electrolytic Copper foil | | | Deposited Side of Electrolytic Copper foil | | Electrolytic Copper Foil |
|---|---|---|---|---|---|---|
| | Surface hardness (GPa) | Light-ness | Rz (μm) | Surface hardness (GPa) | Rz (μm) | Tensile strength (kg/mm$^2$) |
| E1 | 1.5 | 59 | 1.2 | 1.6 | 1.6 | 34.3 |
| E2 | 0.5 | 75 | 1.9 | 1.8 | 1.7 | 34.5 |
| E3 | 2.5 | 49 | 1.3 | 1.6 | 1.6 | 34.4 |
| E4 | 1.9 | 63 | 2.0 | 1.7 | 1.8 | 34.8 |
| E5 | 3.5 | 25 | 1.9 | 1.7 | 2.0 | 34.1 |
| E6 | 2.6 | 55 | 1.2 | 1.8 | 1.4 | 34.7 |
| C1 | 0.2 | 80 | 1.9 | 1.8 | 1.9 | 34.7 |
| C2 | 4.3 | 17 | 1.2 | 1.7 | 1.5 | 34.4 |
| C3 | 0.3 | 78 | 1.9 | 1.6 | 1.8 | 34.3 |
| C4 | 0.4 | 82 | 1.3 | 1.7 | 1.5 | 34.5 |
| C5 | 0.1 | 14 | 2.0 | 1.8 | 1.9 | 34.1 |
| C6 | 3.0 | 21 | 1.3 | 1.7 | 1.6 | 34.2 |
| C7 | 2.2 | 15 | 2.5 | 1.6 | 2.6 | 34.4 |
| C8 | 2.4 | 79 | 1.0 | 1.7 | 1.2 | 34.6 |

As shown in Table 1, from the comparison results of Examples 1 to 6 and Comparative Examples 1 to 8, a thin layer of the copper sulfate electrolyte solution could be preliminarily formed on the cathode drum by spraying a solution to moisten the surface of the cathode drum before the cathode drum was dipped into the copper sulfate electrolyte solution. With the thin layer of the copper sulfate electrolyte solution, the coverage of nucleation points for copper ions on the surface of the cathode drum would be increased. Therefore, the surface of the cathode drum would have a more uniform electrification effect, so the growth rates of the copper lattice at different positions on the surface of the cathode drum would also be more uniform. As a result, the surface hardness of the drum side of the electrolytic copper foil would increase.

Moreover, it showed that the flow rates and the temperatures of the spraying solution and the model number of the polishing wheel would affect the characteristics of the electrolytic copper foils.

When the flow rate is too low, the obtained thin layer of the copper sulfate electrolyte solution on the surface of the cathode drum would have a too thin thickness or a too small area. Therefore, the effect of increasing the hardness of the drum side of the electrolytic copper foil would not be obvious. On the other hand, if the flow rate is too high, the obtained thin layer of the copper sulfate electrolyte solution on the surface of the cathode drum would have many bubbles attached thereto, so the number of nucleation points for copper would be reduced. Thus, the effect of increasing the hardness of the drum side of the electrolytic copper foil would not be obvious. Preferably, the flow rate of the spraying solution ranges from 1 L/min to 65 L/min; more preferably, the flow rate of the spraying solution ranges from 5 L/min to 20 L/min.

When the temperature of the spraying solution is too low, the condition is unfavorable to generating nucleation points. Therefore, the effect of increasing the hardness of the drum side of the obtained electrolytic copper foil would not be obvious. On the other hand, if the temperature is too high, the surface of the cathode drum would be easily oxidized; accordingly, the lightness of the drum side of the obtained electrolytic copper foil would decrease. Preferably, the temperature of the spraying solution ranges from 30° C. to 70° C.; more preferably, the temperature of the spraying solution ranges from 45° C. to 55° C.

When the model number of the polishing wheel used to polish the cathode drum is too small, the lightness of the drum side of the obtained electrolytic copper foil is too low. On the other hand, when the model number of the polishing wheel used to polish the cathode drum is too large, the lightness of the drum side of the obtained electrolytic copper foil is too high. Preferably, the model number of the polishing wheel is Model 1500 and Model 2000.

Manufactures of Electrodes and Lithium Ion Battery

The electrolytic copper foils of Examples 1 to 6 and Comparative Examples 1 to 8 were respectively used to manufacture the electrodes of Examples 7 to 12 and Comparative Examples 9 to 16 by using the following process.

The negative electrode slurry was composed of 100 parts by weight of negative electrode solid materials and 60 parts by weight of 1-Methyl-2-pyrrolidone (NMP). Based on the total weight of the negative electrode solid materials, the negative electrode solid materials comprised 93.9 wt % of mesophase graphite powder (MGP) as a negative electrode active material, 1 wt % of carbon black, 5 wt % of poly-1,1-difluoroethene (PVDF 6020), and 0.1 wt % of oxalic acid.

The negative electrode slurry was coated on the electrolytic copper foils at a speed of 5 m/min until forming a layer with the thickness of 200 μm on the electrolytic copper foils of Examples 1 to 6 and Comparative Examples 1 to 8 respectively. After a completion of coating, the coated electrolytic copper foils were dried at a temperature of 160° C., and then the electrodes of Examples 7 to 12 and Comparative Examples 9 to 16 were obtained.

Analysis 5: Test of Pressing the Electrolytic Copper Foils

In order to observe whether there was breaking at the boundary between the region coated with the negative electrode slurry and the region not coated with the negative electrode slurry of the electrolytic copper foil, the electrodes of Examples 7 to 12 and Comparative Examples 9 to 16 were rolled by a wheel of the pressing machine at a speed of 1 m/min and a pressure of 3000 pound per square inch (psi). The wheel made from high-carbon chromium bearing steel (SUJ2) had a diameter of 250 mm and a Rockwell hardness (HRC) of 62 to 65 degrees. The results of the electrodes of Examples 7 to 12 and Comparative Examples 9 to 16 were shown in Table 2.

The electrodes of Examples 7 to 12 and Comparative Examples 9 to 16 were respectively used to manufacture the lithium ion batteries by using the following process.

Take the lithium ion battery comprising the electrode of Example 7 as an example:

The positive electrode slurry was composed of 100 parts by weight of positive electrode solid materials and 195 parts by weight of NMP. Based on the total weight of the positive electrode solid materials, the positive electrode solid materials comprised 89 wt % of lithium cobalt oxide (LiCoO$_2$) as a positive electrode active material, 5 wt % of flaked graphite (KS6), 1 wt % of conductive carbon powder (Super P®), and 5 wt % of poly-1,1-difluoroethene (PVDF 1300).

The positive electrode slurry was coated on aluminum foils to form a layer with the thickness of 250 nm. After completion of coating, the coated aluminum foil was dried at a temperature of 160° C., and then the positive electrode was obtained.

The positive electrodes and the electrodes of Example 7, which were as the negative electrodes, were alternately stacked to form a laminated body with a respective microporous separator between each two successive positive and negative electrodes. The laminated body was deposited in a press mold filled with an electrolyte solution (a volume ratio of EC to DMC was 1:1) and was packaged to form a stacked type lithium ion battery. The stacked type lithium ion battery had a size of 41 mm×34 mm×53 mm.

Analysis 6: Test for Cycle Life of the Lithium Ion Batteries

The lithium ion batteries comprising the electrodes of Examples 7 to 12 and Comparative Examples 9 to 16 respectively were processed with charge and discharge tests at a temperature of 55° C. The charging step was processed under a constant current-constant voltage mode (CCCV), wherein the charging voltage was 4.2 V, and the charging current was 5 C. The discharging step was processed under a constant current mode (CC), wherein the discharging voltage was 2.8 V, and the discharging current was 5 C.

The cycle life was defined as the times of charge and discharge cycles performed when the capacity of the lithium ion battery fell to 80% of its initial capacity.

TABLE 2 pressing test of the electrodes of Examples 7 to 12 and Comparative Examples 9 to 16 and cycle lives of charge and discharge tests of the lithium ion batteries comprising Examples 7 to 12 and Comparative Examples 9 to 16

| Negative Electrode No. | Electrolytic copper foil No. | Pressing Test | Cycle Life (times) |
| --- | --- | --- | --- |
| E7 | E1 | Not broken | 1124 |
| E8 | E2 | Not broken | 1153 |
| E9 | E3 | Not broken | 1211 |
| E10 | E4 | Not broken | 1192 |
| E11 | E5 | Not broken | 1183 |
| E12 | E6 | Not broken | 1217 |
| C9 | C1 | Broken | — |
| C10 | C2 | Not broken | 653 |
| C11 | C3 | Broken | — |
| C12 | C4 | Broken | — |
| C13 | C5 | Broken | — |
| C14 | C6 | Not broken | 571 |
| C15 | C7 | Not broken | 592 |
| C16 | C8 | Not broken | 478 |

As shown in Table 2, all electrodes of Examples 7 to 12 were not broken during the pressing process because the electrodes of Examples 7 to 12 respectively comprised the electrolytic copper foils of Examples 1 to 6, and the electrolytic copper foils of Examples 1 to 6 had a certain range of surface hardness and a certain range of lightness of the drum sides. It demonstrates that the electrode of the instant disclosure has a good mechanical property.

As shown in Table 2, all lithium ion batteries comprising the electrodes of Examples 7 to 12 respectively had a longer cycle life. It demonstrates that the lithium ion battery of the instant disclosure has an excellent cycle performance, so the lithium ion battery of the instant disclosure would have a longer service life.

In contrast, the electrodes of Comparative Examples 9, and 11 to 13 which respectively comprised the electrolytic copper foils of Comparative Examples 1, and 3 to 5 still had breaking after pressing. Even though the electrodes of Comparative Examples 10, and 14 to 16, which respectively comprised the electrolytic copper foils of Comparative Examples 2, and 6 to 8, did not break after pressing, the lithium ion batteries comprising the same still had a poor cycle performance.

It demonstrates that the electrodes of Comparative Examples 9 to 16 did not have the same properties as electrodes of Examples 7 to 12 because the electrodes of Comparative Examples 9 to 16 respectively comprised the electrolytic copper foils of Comparative Examples 1 to 8, which did not control their surface hardness and the lightness of the drum sides in the certain range.

Furthermore, the electrolytic copper foils of Examples 1 to 6 could obtain the desired surface hardness and lightness without undergoing multiple forming processes, and the electrolytic copper foils met the requirements of the lithium ion batteries. Therefore, the electrolytic copper foil of the instant disclosure has a higher potential for commerce because it is easy to manufacture.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. An electrolytic copper foil comprising:
   a drum side and a deposited side opposing to the drum side;
   wherein a nanoindentation hardness of the drum side is equal to or larger than 0.5 GPa and equal to or smaller than 3.5 GPa; and
   a lightness (L*) of the drum side is equal to or larger than 25 and equal to or smaller than 75, wherein the lightness (L*) is one of three elements of a color system defined in JIS Z 8729.

2. The electrolytic copper foil as claimed in claim 1, wherein the nanoindentation hardness of the drum side is equal to or larger than 1.0 GPa and equal to or smaller than 3.0 GPa.

3. The electrolytic copper foil as claimed in claim 1, wherein a tensile strength of the electrolytic copper foil is equal to or larger than 34 kgf/mm$^2$.

4. The electrolytic copper foil as claimed in claim 1, wherein the electrolytic copper foil further comprises an inorganic anti-corrosion layer formed on at least one of the drum side and the deposited side.

5. The electrolytic copper foil as claimed in claim 4, wherein the inorganic anti-corrosion layer comprises a chromate.

6. The electrolytic copper foil as claimed in claim 4, wherein the electrolytic copper foil further comprises another inorganic anti-corrosion layer, the inorganic anti-corrosion layer is formed on the drum side, and said another inorganic anti-corrosion layer is formed on the deposited side.

7. The electrolytic copper foil as claimed in claim 1, wherein the electrolytic copper foil further comprises an organic anti-corrosion layer formed on at least one of the drum side and the deposited side.

8. The electrolytic copper foil as claimed in claim 7, wherein the organic anti-corrosion layer comprises an azole compound.

9. The electrolytic copper foil as claimed in claim 7, wherein the electrolytic copper foil further comprises another organic anti-corrosion layer, the organic anti-corrosion layer is formed on the drum side, and said another organic anti-corrosion layer is formed on the deposited side.

10. An electrode for a lithium ion battery comprising: the electrolytic copper foil as claimed in claim 1, a binder, and an active material.

11. The electrode as claimed in claim 10, wherein the active material comprises a carbon material, a silicon material, a metal, a metal oxide, a metal alloy, a polymer, or any combination thereof.

12. A lithium ion battery comprising: a positive electrode, a negative electrode, and an electrolyte solution; wherein the negative electrode is the electrode as claimed in claim 10.

* * * * *